United States Patent Office 3,652,701
Patented Mar. 28, 1972

3,652,701
IN SITU PREPARATION OF CLATHRATING SOLIDS
Everett J. Fuller, Gillettte, N.J., assignor to Esso Research and Engineering Company
No Drawing. Continuation-in-part of application Ser. No. 823,958, May 12, 1969, now Patent No. 3,567,791. This application May 25, 1970, Ser. No. 40,396
Int. Cl. C07c 7/10
U.S. Cl. 260—674 WC                          15 Claims

ABSTRACT OF THE DISCLOSURE

A separation process in which aromatics are separated from feed streams in which they are contained by contacting said aromatics on a continuous basis with a slurry comprising a solvent and a Werner Complex which is capable of complexing with said aromatic is improved by forming said Werner Complex in situ within the solvent.

CROSS-REFERENCE TO RELATED APPLICATIONS

This invention is a continuation-in-part of U.S. Ser. No. 823,958 filed May 12, 1969, now Pat. No. 3,567,791, entitled Extraction Process, inventor: E. J. Fuller.

BACKGROUND OF THE INVENTION

Field of the invention

This invention relates to an improved process for the removal of aromatics from a feed stream. More particularly, this invention relates to the removal of aromatics from petroleum fractions or hydrocarbon fractions boiling in the range of 70° to 1200° F. The removal of aromatics from these fractions is accomplished by contacting the feed stream with a Werner Complex which is an inclusion forming substance, or host, which is capable of complexing with one or more aromatic constituents or guests within the feed mixture. The inclusion forming substance is slurried within a liquid solvent, to produce a mixture of from 1 to 60 weight percent solid and from 40 to 99 weight percent liquid. This mixture is used as an extraction medium to remove aromatics from the feed stream. The solvent should also have the ability to extract aromatics from the feed stream; the inclusion forming substance is formed in situ from its constituents, within the solvent.

Additionally, it is essential that the solvent be capable of permitting the formation, after complexation, of separate layers: one layer containing the feed stream depleted in the guest aromatic, the other layer, a slurry of the solvent with a complex of aromatic and host compound. The solvent is also enriched in the aromatic constituents of the feed stream.

DESCRIPTION OF THE PRIOR ART

The use of inclusion compound forming substances such as Werner Complexes for the preferential removal of various compounds from a mixture has been known for a considerable length of time. The historical development and chemical nature of such compounds is well documented in Mandelcorn, "Non-Stoichiometric Compounds," Academic Press, 1964. The use of the term non-stoichiometric, as applied to complexes formed by the inclusion compounds, which complex comprises a host and a guest, is appropriate since X-ray data regarding such complexes reveal that the guest compound may be trapped in channels in the case of urea or cages in the case of clathrates which are formed by the continuous crystal lattice of the host compound. Such compounds do not necessarily obey the law of simple multiple proportions and the molecular ratio of host to guest need not be a whole number. The stability of the complex, then, may depend primarily upon a physical relationship or fit between the guest molecules and the channels of the host rather than on a chemical relationship between the guest molecule and the channel-forming compound.

Werner Complexes have been used effectively to remove aromatics from admixture with other compounds and are discussed at length in British Pat. No. 1,055,815 assigned to the Union Oil Company and a publication, "Use of Werner Complexes for the Clathration Separation of Organic Mixtures," W. D. Schaeffer et al., 6th World Petroleum Congress, Volume 4, pages 65–73, both of which are herein incorporated by reference.

The Werner Complexes useful in the process of this invention have the following characteristics:

(1) They are described by the formula $(M_1)_a B_x (X_2)_c$, where $M_1$ is a metal ion, preferably of atomic number greater than 11, B is a basic nitrogen compound such as pyridine, $X_2$ is an anion such as chloride, and $a$, $x$, and $c$ are integers from 1 to 6.

(2) They form solid derivatives with aromatic molecules.

(3) They are only slightly soluble in hydrocarbon solvents, i.e., less than 25% by weight of the saturated solution would consist of salt.

(4) They are moderately or very soluble in polar organic solvents such as ethers, alcohols, esters, ketones, etc., i.e., to 25 weight percent or more of the saturated solution.

A typical Werner Complex, which is preferred, is nickel tetra (4-methyl pyridine) dithiocyanate. This compound contains the two portions which typically make up the Werner Complex: the Werner salt, which is the nickel thiocyanate, and the Werner amine, which is 4-methyl pyridine.

Werner Complexes are added directly to a processing technique such as the one disclosed in U.S. Ser. No. 823,958. In that technique aromatics are removed on a continuous basis from feed streams which are preferably hydrocarbon feed streams boiling in the range of 70 to 1200° F. This is accomplished by contacting, preferably countercurrently within a suitable contacting device, a feed stream containing aromatics and a slurry comprising a Werner Complex such as those disclosed herein and a liquid solvent which may be capable of extracting aromatics. The liquid solvent must be of such a nature as to promote the formation of separate layers after extraction and complexation have taken place. The top layer or raffinate, comprises the feed stream depleted in aromatics. The bottom layer is a slurry of solid complex, said complex comprising aromatics adducted by a host compound such as a Werner Complex and said solution comprising aromatic hydrocarbons extracted and dissolved in the solvent. Ambient pressures and temperatures may effectively be utilized during this contacting technique. Following the contacting, within a suitable contacting device such as a sieve tray tower or a packed tower, the slurry mixture obtained flows continually from the system since it is readily pumpable. This process represents a significant step forward in the art, however, there is considerable expense involved in the direct addition of a Werner Complex.

The Werner Complex slurry as described in Ser. No. 823,958 is formed by combination of the previously prepared Werner Complex with the solvent in the proportions desired. Preparation of such Werner Complexes is a straightforward laboratory operation, but is cumbersome, time-consuming and expensive on the scale of continuous commercial operations. The laboratory preparation techniques are described in the literature, for example, W. D. Schaeffer, W. S. Dorsey, D. A. Skinner and C. G. Christian, J. Am. Chem. Soc. 79, 5870 (1957). Essentially, the Werner Complex is precipitated from its elements in water solution, filtered free of water and the dissolved salts which are by-products of the synthesis, dried to remove water, and ground to a powder. Use of the powder is filled with uncertainties, since the amount of activity it possesses depends on the water content (affected by relative humidity, efficiency of drying, particle size, and storage techniques) and on possible loss of amine constituent by evaporation. In addition, the particle size will effect the rate of equilibration with feed mixture since at no point in the extraction or in preparing for it is the Werner Complex totally dissolved, and the clathration of aromatics would be expected to be slower if larger particles of solid were present, because of the normal torpidity of solid dissolution and re-precipitation.

Thus, a process is needed which will reduce the expense associated with the use of Werner Complexes and simultaneously improve the efficiency of the separation.

Earlier attempts to form Werner Complexes in situ would not be applicable to a process such as that described in U.S. Ser. No. 823,958. Typical of such processess is one found in Canadian Pat. No. 809,664 in which a solution of the Werner Complex is formed.

Conditions for effecting complete solution of the Werner Complex prior to precipitation as aromatic clathrate are distinct from those needed to prepare a slurry of the solid. For example, the solvent need not have so high a capacity for the Werner salt in the slurry case, but must act to facilitate the rapid equilibration of feed with Werner salt and allow rapid separation of raffinate from slurry. The type of solvent and its quantity relative to the solid will be critical in the slurry case, but will not be chosen to completely dissolve the Werner salt. The need to exclude from the system all the solid by-products, such as potassium chloride, of the Werner salt synthesis does not exist if the process of U.S. Ser. No. 823,958 is followed, since the slurry contains solids in any case. The various mixing, refluxing and heating operations of Canadian Pat. 809,664 designed to remove by-products and obtain a clear solution of Werner Complex in a primary solvent are needed if the separations process depends on filtering a solid clathrate. Preparation of a suitable extracting slurry mixture, on the other hand, would be quite a different operation.

SUMMARY OF THE INVENTION

In accordance with this invention it has unexpectedly been discovered that while utilizing a system such as that disclosed in U.S. Ser. No. 823,958 the Werner Complex may be formed in situ from inexpensive starting materials. The starting materials are as follows:

(1) A metal salt, chosen to contain the positively charged metal ion desired in the final Werner Complex;

(2) A second salt, chosen to contain the anion group desired in the final Werner Complex;

(3) The Werner amine.

Formation of the entire slurry of Werner Complex in situ is advantageous in that:

(1) The operations of crystallization and filtration of the solid Werner Complex are avoided in slurry preparation as well as in subsequent processing as described in U.S. Ser. No. 823,958.

(2) In situ preparation of the slurry from metal salts and Werner amine should result in a considerable saving in cost over either direct purchase of the solid Werner Complex or its manufacture at the processing site as a dry powder.

(3) Dry, finely powdered Werner Complexes may tend to absorb water, lose Werner amine, or both. This makes preparation of a reproducibly active complex slurry quite difficult, since drying procedures to remove water may also remove Werner amine, and assay procedures for solid complex are neither well established nor particularly reliable when extended to the slurry actually used. The slurry formed in situ, on the other hand, is defined by weighing known amounts of chemicals which are stable to storage, so it is as reproducible in analysis and properties as desired.

The three materials are contacted at temperatures and pressures which may vary from ambient to elevated, within the solvent which is utilized in the separation process. Unlike the process in Canadian Pat. 809,664 a slurry is formed; this slurry is essential to the operation of the process and consequently only particular solvents which will be designated here-in-after may be utilized during the formation of the Werner Complex in situ.

In more detail, there are three (3) elements which are to be combined to produce the Werner Complex. Initially, there is a Werner salt, this is a salt of a metal whose atomic number is above 12 and has the general formula $M_1X_1$ wherein $M_1$ is nickel, cobalt, iron, manganeses, silver, palladium, platinum, copper, zinc or any other metal capable of forming complexes of the Werner type.

The $X_1$ element is an anion which is a negative radical such as halogen, sulfate, nitrate, phosphate, carbonate, or in general any anion associated with $M_1$. The restrictions on $X_1$ will be mainly economic, and the least costly form of $M_1X_1$ will be acceptable, provided $M_1X_1$ is stable enough to store until used in slurry preparation and that $X_1$ does not decompose under conditions of the process.

The preferred negative radicals are chloride, acetate and sulfate.

Next, one or more Werner amines may be utilized. Werner amines are heterocyclic nitrogen bases which tend to bind to a central metal atom through coordinate bonds, such as an amine, an aromatic amine, or a substituted pyridine which binds to the central metal atom of the Werner Complex through coordinate bonds. Any nitrogen base which is sufficiently basic to form coordinate complexes with the Werner salts may be utilized, provided that selective complexing of aromatics can occur. This would include monocyclic and polycyclic compounds. Examples of suitable and preferred bases include pyridine, substituted pyridine and substituted pyrrols. Typical groups which may be used to substitute are halogen, hydroxyl, nitro, alkoxy, aryloxy, amino, cyano, etc. These compounds would include the following:

TABLE I 4-methylpyridine
4-ethylpyridine
4-n-propylpyridine
4-isopropylpyridine
4-n-butylpyridine
4-n-hexylpyridine
4-vinylpyridine
4-fluoropyridine
4-chloropyridine
4-bromopyridine
4-hydroxypyridine
4-hydroxymethylpyridine
4-methoxypyridine
4-aminopyridine
methylisonicotinate
4-cyanopyridine
4-acetylpyridine
4-chloromethylpyridine
3-methylpyridine
3-ethylpyridine
3-n-propylpyridine
3-isopropylpyridine
3-n-butylpyridine
3-vinylpyridine
3-chloropyridine
3-hydroxypyridine TABLE I.—Continued 3-methoxypyridine
3-acetylpyridine
3-cyanopyridine
ethyl nicotinate
3,4-dimethylpyridine
3,4-diethylpyridine
3-methyl, 4-ethylpyridine
4-methyl, 3-ethylpyridine
4-methyl 3-n-hexylpyridine
4-methyl, 3-cyanopyridine
4-chloro, 3-methylpyridine
4-acetyl, 3-methylpyridine
4-methoxy, 3-ethylpyridine
isoquinoline While, as indicated above, the Werner amines suitable for use in the preparation of Werner Complexes within the scope of this invention are normally heterocyclic nitrogen bases, it is not essential that this be the case and other aromatic nitrogen bases known to form Werner Complexes suitable for invention can be used in lieu of said heterocyclic bases if desired. Particularly exemplary of nitrogen bases, other than heterocyclic bases, suitable for such purposes, are the substituted primary benzylamines having one or the other of the following general formulas:

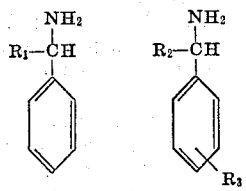

wherein $R_1$ is a primary alkyl group, $R_2$ is hydrogen or a primary alkyl group and $R_3$ is a neutral, relatively non-coordinating functional group such as alkyl, halogen, hydroxyl, nitro, alkoxy, aryloxy, cyano, carboalkoxy, and alkanoyl such as acetyl, which is compatible with any functional groups present in the mixture of compounds to be separated by the particular Werner Complex under consideration. $R_3$ may be either polar or not and it can be located on the ortho, meta or para position of the benzene ring.

Other aromatic nitrogen bases which may be used in the instant invention have the following general formula:

TABLE II

α-methylbenzylamine
α-ethylbenzylamine
α-propylbenzylamine
α-butylbenzylamine
α-isobutylbenzylamine
α-amylbenzylamine
α-hexylbenzylamine
α-octylbenzylamine
α-methyl-p-methylbenzylamine
α-methyl-o-methylbenzylamine
α-methyl-p-ethylbenzylamine
α-methyl-p-isopropylbenzylamine
α-methyl-p-t-butylbenzylamine
α-methyl-p-methoxybenzylamine
α-methyl-p-fluorobenzylamine
α-methyl-p-chlorobenzylamine
α-methyl-o-chlorobenzylamine
α-methyl-p-bromobenzylamine
α-methyl-p-iodobenzylamine
α-methyl-m-nitrobenzylamine
α-propyl-p-methylbenzylamine
α-propyl-p-bromobenzylamine
α-isobutyl-p-bromobenzylamine
α-methyl-p-cyclohexylbenzylamine
p-methylbenzylamine
p-bromobenzylamine
p-dimethylaminobenzylamine Many other similar examples of suitable Werner amines could be listed, as will be apparent to those skilled in the art and the complexes may include only one such amine, or a mixture of two or more may be employed, in which case a mixed complex is formed.

Finally, a salt $M_2X_2$ is added to provide the desired anion of the Werner salt.

The anion of the Werner salt, $X_2$, may comprise any suitable negative radical such as, for example, thiocyanate, isothiocyanate, azide, cyanate, isocyanate, cyanide, sulfate, nitrate, nitrite, chloride, bromide, iodide, phosphate, formate, acetate and the like.

$M_2$ is a positive ion chosen to provide $X_2$ in as inexpensive and convenient a form as possible, it may be sodium, potassium, ammonium, barium, magnesium, aluminum, or any commonly available positively charged ion. When the Werner Complex $M_1B_xX_2$ is formed in situ by mixing $M_1X_1$, B (the Werner amine), and $M_2X_2$, it follows that the combination $M_2X_1$ is potentially in the slurry. Care should be taken that $M_2X_1$ produces no toxicity or corrosion problem (for example, $M_2=H^+$ $X_1=F^-$ would produce hydrofluoric acid, which would be generally undesirable in process equipment).

Either $M_1X_1$, $M_2X_2$, or both may be associated with solvent molecules, i.e., water. The subsequent slurry processing involves use of solvent to render the Werner Complex pumpable and to provide some solvent preference for aromatics; in general the water of hydration of $M_1X_1$ or $M_2X_2$ will change the properties of the slurry to be formed but little. In fact, if the slurry solvent contains water by definition, its preparation by addition of $M_1X_1$ or $M_2X_2$ as hydrates is simplified.

The entire Werner Complex has the following general formula:

$$(M_1)_a B_x (X_2)_c$$

wherein $M_1$ is a metal atom as above defined, B is the Werner amine, $X_2$ is the anion as above defined, $a$ is a number from 1 to 2, $x$ is a number from 1 to 6, and $c$ is a number from 1 to 3. To obtain $(M_1)_a(B)_x(X_2)_c$ one must add $a$ moles of $M_1X_1$, $x$ moles of Werner amine and $c$ moles of $M_2X_2$.

The three (3) elements which are to be combined are brought together in the molar ratio of $a$ $M_1X_1$ to $x$ Werner amine to $cM_2X_2$, corresponding to the general formula of the Werner Complex and to the specific formula of the complex to be used.

The three (3) elements are brought together by simple mixing within a solvent at ambient conditions, said solvent being particularly adapted to the process of Ser. No. 823,958.

The solvent is essential since it must have the previously mentioned characteristics; of paramount importance is the fact that the solvent will not completely dissolve the Werner Complex which is formed. In fact no more than about 1 to 10 weight percent of the solution in equilibrium with undissolved solid will be dissolved Werner Complex. This is essential to provide an excess of undissolved Werner Complex in contact with the feed or depleted feed at all points during the extraction and to avoid a drastic change in flow properties of the slurry within the extraction unit. The fact that the slurry has generally the same pumpability whether going into or coming out of the extraction unit indeed allows the operation of the process in a continuous countercurrent multistage fashion, as opposed to the processes of the prior art.

Particular solvents which may be utilized in the instant invention are polar solvents, preferably ether alcohols and polyols. Ether alcohols applicable to this invention may be represented by the generic formula R—O—R'—OH wherein R may be an alkyl or alkoxy radical and R' may be an alkylene radical. Preferably these radicals will have two to six carbons. The major requirement is that the solvent be liquid at the operating temperatures utilized i.e. about 70 to 200 degrees, Fahrenheit. Examples of such compounds are 2-methoxyethanol, 2-(2 ethoxy ethoxy)

ethanol and the like. Polyols applicable herein are preferably of a low molecular weight and contain from about 2 to about 6 carbon atoms: e.g. diethylene glycol, ethylene glycol, glycerol, carboxylic acid esters of glycerol, e.g. mono-acetin. Additionally, compounds such as furfural alcohol, N-methyl pyrrolidine, propylene carbonate, 1-piperazine ethanol, 2 chloro-ethanol, liquid phosphate esters such as tri-butyl phosphate, sulfolane, mixtures containing a minor proportion of ethylene glycol and a major proportion of 2-ethoxy ethanol, e.g. 25%/75% and mixtures containing a major proportion of 2-methoxy ethanol and a minor proportion of 2-ethoxy ethylacetate e.g. 75%/25% may be used as solvents.

A highly preferred solvent is 2-methoxy ethanol which readily promotes adduct and slurry formation.

The various elements are formed within the solvents usually at a temperature of 50 to 250° F., preferably 70 to 100° F. Pressures may vary between 0.1 to 50 atm.; atmospheric pressure is normally convenient. Contact times may vary between 1 minute and 5 hours, preferably 1 to 50 minutes. Stirring and order of addition to the slurry preparation container are not critical. The time necessary to equilibrate the components into an operable slurry will in general be less if the solids, i.e. $M_1X_1$, and $M_2X_2$, are finely ground. After the formation of the Werner Complex in situ within the solvent the solvent is contacted continuously and countercurrently with various feed streams.

Feed streams which may be treated by the instant invention are those from which it is desired to separate aromatics. This would include aromatics having from 6 to 12 carbons and those having condensed rings such as anthracene and naphthalene. The aromatics would thus include benzene, toluene, the ortho, meta and para xylene isomers, $C_7$ to $C_{12}$ alkyl derivatives of benzene in general, the polynuclear aromatics such as naphthalene, phenanthrene and alkyl or cycloalkyl derivatives of any of these. Typically, the aromatics to be removed by the instant invention would be found in hydrocarbon feed streams boiling between 70° and 1200° F. More specifically, the process of the instant invention would be used to remove aromatics from steam cracked naphthas which boil between 120° and 300° F. It is particularly important to remove aromatics such as benzene, toluene, and xylenes from naphthas because of their value as chemical raw materials. Other feed streams which may be treated by the instant invention include the following: light virgin naphthas, kerosenes, gas oils, and lube stocks. For instance, it may be advantageous to extract the aromatics from a light naphtha so as to reduce throughput to a reforming operation. In addition, the presence of a high concentration of aromatics within a kerosene range fraction such as a jet fuel, boiling generally between 275° and 625° F., is undesirable because of the unfavorable burning characteristics and lower energy content associated with aromatics. Aromatics within a lube oil fraction, boiling between 400° and 1200° F., are also undesirable because they cause poor oxidation stability and have an adverse effect on viscosity index.

A particularly effective separation for the Werner Complexes of the instant invention is the separation of the $C_8$ aromatic isomers ortho, meta and para-xylene, and ethylbenzene.

The probable Werner Complex to be used in this instance is $Ni(4\text{-methylpyridine})_4(SCN)_2$, because its selectivity to form a clathrate of paraxylene in the presence of the other $C_8$ aromatics is high and because the chemicals market for paraxylene is more favorable than that for the other isomers.

Preparation of the Werner Complex to start the continuous operation is done by mixing nickel chloride hexahydrate, potassium thiocyanate, 4-methylpyridine, and sulfolane in the weight ratio of 1/0.81/1.56/11.2, at ambient conditions, for a period of 20–40 minutes with good agitation. The resulting slurry is pumped into the extraction unit where it countercurrently contacts a feed mixture of hydrocarbons containing 15 to 25 wt. percent xylene. Paraxylene is selectively clathrated by the slurry over several stages of extraction. The other isomers are removed from slurry by several washing stages wherein the slurry is equilibrated with a high concentration of paraxylene, such that as slurry emerges from the extraction unit, the contamination of the paraxylene by other isomers is less than 1%. The slurry is stripped of paraxylene by equilibration with a paraffinic wash at elevated temperature, then recycled to the extraction unit. Processing loss of slurry is made up for by occasional addition of fresh slurry prepared as described above. Paraxylene is distilled from the paraffinic wash, which is recycled. The feed stream, depleted in paraxylene, emerges from the extraction unit as a raffinate.

Reaction conditions for conducting the separation process will, of course, vary widely with the system utilized. Generally, however, there are no critical limitations and it is only necessary that the system be a liquid-liquid-solid (slurry) system, i.e., none of the liquid constituents freeze and the complexing agent and adduct are stable. For example, typical temperatures may range from about −50° C., to about 180° C., preferably about −10° C., to about 100° C. Below −50° C., components may begin to solidify, solutions become more viscous, thereby inhibiting pumping and equilibrium solubilities are lowered. Above about 180° C., the adducts tend to become unstable. As temperatures decrease the stability of an adduct tends to increase.

Similarly, pressures are not critical and the processes may be conducted at subatmospheric pressures, e.g., 0.1 atmosphere, as well as superatmospheric pressure, e.g., 50 atomspheres. Atmospheric pressure is normally convenient for most processes. Reaction period will, of course, vary widely and is not critical. The duration of the contacting should be sufficient to establish an equilibrium in the system. In continuous countercurrent operations, the slurry mixture should equilibrate with the other liquid phase at each stage of the process. The nature of the contacting device is such as to provide several stages of equilibrium. Adduction periods for Werner Complexes can normally range from 1 second to 15 minutes preferably 1 second to 30 seconds, for a countercurrent operation without unreasonably large equipment.

The quality of solvent employed is that quantity which will be sufficient to allow the formation of two liquid phases in the system and will generally range, on a volume basis, from about 1/10 to 10/1 in parts of solvent/parts of adducting substance, i.e., host. Typical ratios for Werner Complexes with various solvents will range from 3/1 to 10/1.

The amount of complexing agent, i.e., $Ni(4\text{ methyl pyridine})_4(SCN)_2$, ranges from about 1 to 3.5 parts of this Werner Complex by weight per part of separable constituent, i.e., aromatic. Nevertheless, these amounts may vary upwardly or downwardly by the very nature of the complexation. One skilled in the art, after relatively little and routine experimentation, will be able to determine optimum weight ratios for any desired separation using any desired complexing substance.

The rate at which the hydrocarbon feed stream will be introduced into the contacting zone, the zone dimensions, and length to diameter ratio will depend on the size of the plant, the feed and product compositions, and the design of the contacting unit chosen for any particular separation. Consequently, typical residence times for a given drop of feed stream within the contacting zone will be from about a few seconds, i.e., 4 or 5, to 5 to 10 minutes, preferably 1 to 3 minutes. This may be compared quite favorably with batch adduction times in other complexing processes known to the art which are normally from about 30 minutes on upward and may extend to over 4 or 5 hours.

The contacting device may be any unit in which a multiplicity of equilibria may be reached such as a tower containing any suitable packing material, i.e., Raschig rings, or a sieve plate tower. In essence, the unit has somewhat the same function as a distillation column with many plates. Several equilibria are established during the course of the feed stream's passage through the column while countercurrently contacting the solvent-solid slurry.

Any adduct initially made is subject to equilibration with the whole range of compositions of hydrocarbon mixture from feed to final raffinate, and in a washing section may indeed be equilibrated with pure product, so that the complexed guest may be as pure as desired, depending on the number of stages utilized. The raffinate leaving the unit will have been equilibrated with fresh slurry after having been repeatedly contacted over several equilibrium stages with ever-less saturated slurry. In this way, because of the extremely short residence times needed for this process, the maximum cleanup of raffinate and product purities may be obtained. After the slurry has been saturated with aromatics over the several stages of contacting with feed and product wash, the aromatic product may be removed readily by equilibrating the slurry with an excess of a substance or mixture which tends to dissolve the aromatics but which will not destroy the slurry. For example, n-pentane could be utilized. The stripping of products from slurry is in a sense the reverse of the extraction itself. Some heating of the slurry to aid in stripping off the more tightly adducted aromatics may prove beneficial. It is emphasized that the stripping process is also continuous and may be done over several equilibrium stages; without the short residence times the process of this invention provides, it would be impractical. The stripped slurry may be freed of stripping solvent by flask evaporation of the pentane on a continuous basis, after which it is pumped back to the extraction unit.

In a preferred embodiment of the instant invention a mixed xylene feed stream containing 10 to 25 weight percent paraxylene, 35 to 50 weight percent metaxylene, 10 to 25 weight percent orthoxylene and 10 to 25 weight percent ethylbenzene is separated in a packed tower. The feed stream is introduced into one end of the tower. It is countercurrently contacted within the tower with a slurry said slurry comprising a solvent which is sulfolane containing the Werner Complex $Ni(4-methylpyridine)_4(SCN)_2$. The Werner Complex was formed in situ in a preparation vessel as follows: one weight of $NiCl_2 6H_2O$ to 0.81 weight of potassium thiocyanate to 1.56 weights of 4-methylpyridine were contacted within 11.2 weights of the solvent. Temperature was maintained at 70 to 100° F., pressure was atmospheric. Contacting time was 1 to 50 minutes. The formation of the Werner Complex was observed as indicated by its purple color, visually quite distinct from the green nickel chloride added. About 10 to 15 weight percent of the Werner Complex made dissolves in the solvent. The proportions of slurry components were adjusted so that no more than that amount of Werner Complex would dissolve. Should additional Werner Complex dissolve the components of the complex should be added to make up for what dissolved, so as to keep the ratio of solution to solid in the slurry at or near 5 to 1. Solvents useful in this process need not totally dissolve the Werner Complex in the absence of aromatics so the solids content of the slurry may be kept around 15 to 20% throughout.

Following the formation of the Werner Complex in situ the slurry of solvent and Werner Complex was introduced into the other end of the tower zone.

The feed stream flow rate was 50 to 100 lb./hr., the flow rate of slurry to the tower was 500.00 to 600.00 lb./hr., and 50,000 to 100,000 lb./hr., of hexane was pumped into the tower at the bottom to ensure the presence of two liquid phases. The latter stream is essential since aromatics dissolve rather completely in sulfolane, even when sulfolane contains dissolved Werner Complex.

Contacting took place at a temperature of 70 to 100° F. and a pressure of one atmosphere. A slurry of solvent and Werner Complex adducted with paraxylene was removed from one end of the tower and feed stream depleted in paraxylene was removed from the other end of the tower. Paraxylene was stripped from slurry by washing with hexane under pressure at 100° C. The hexane flow rate to the stripper was 50,000 to 100,000 lb./hr. The stripped slurry was cooled and recycled to the extraction unit. Hexane was flash distilled from the product paraxylene.

The feed stream depleted in paraxylene was analyzed and the following aromatics distribution was found; 2% paraxylene, 24.5% o-xylene, 24.5% ethylbenzene and 49% m-xylene.

DESCRIPTION OF SPECIFIC EXAMPLES

Example I

In this example, 50 g. of pre-synthesized solid Werner Complex was mixed with 250 g. of propylene carbonate solvent at 25° C. in a high-speed blender for 5 minutes to form an extracting slurry mixture.

Following this paraxylene was separated from the other $C_8$ aromatics by a single stage batch slurry adduction. Temperature during the separation was 25° C., pressure was ambient and the contacting time was 10 minutes.

TABLE I

[Equilibrium obtained using $Ni(4-methylpyridine)_4(SCN)_2$]

| Substance | Charge, g. | Extract from slurry, g. | Raffinate, g. |
|---|---|---|---|
| m-Xylene | 40 | 14.7 | 25.3 |
| p-Xylene | 20 | 10.1 | 9.8 |
| o-Xylene | 20 | 5.9 | 14.1 |
| Ethylbenzene | 20 | 8.2 | 11.8 |
| n-Heptane | 100 | 12.2 | 87.8 |
| Total | 200 | 51.1 | 148.9 |

From the above it is seen that although all the aromatics were concentrated in the slurry relative to the heptane, paraxylene was much more strongly extracted.

Example II

By way of comparison with Example I, the slurry in this example was prepared in situ according to the process of this invention. 21.7 g. of $NiCl_2 \cdot 6H_2O$, 34 g. of 4-methylpyridine, and 17.8 g. of KSCN were mixed for 2 minutes at 25° C. with 250 g. of propylene carbonate solvent. The resulting purple slurry was mixed for 30 seconds with the same amounts of the same hydrocarbons as in the previous example. Analysis of the raffinate and slurry extract are shown in Table II.

TABLE II

Equilibrium obtained using slurry formed in situ

| Substance | Charge, g. | Extract from slurry, g. | Raffinate, g. |
|---|---|---|---|
| m-Xylene | 40 | 16.7 | 23.39 |
| Paraxylene | 20 | 11.0 | 9.02 |
| o-Xylene | 20 | 9.0 | 11.0 |
| Ethylbenzene | 20 | 9.5 | 10.5 |
| n-Heptane | 100 | 14.9 | 85.1 |
| Total | 200 | 61.1 | 138.9 |

It is evident that paraxylene was again concentrated in the slurry. This indicates that the slurry mixture may be prepared in situ without removal of the by-products KCl and water, and an excellent separation may be obtained. It is noteworthy that complete separation would be the result of operation over more than one stage of extraction and washing of the slurry with paraxylene. That this is feasible is illustrated by that fact that the results of Table II were obtained after mixing slurry with feed for only 30 seconds.

Example III 32 g. of $FeCl_2.4H_2O$, 60 g. of 4-methylpyridine, 31.2 g. of KSCH, and 266 g. of sulfolane (tetrahydrothiophene 1,1-dioxide) were mixed at 25° C. and atmospheric pressure for 5 minutes. To the resulting slurry was added 111 g. of a xylenes-ethyl-benzene-n-heptane mixture. After mixing for 5 minutes at 25° C., the hydrocarbon layer was separated and the phases were analyzed. Results as shown in Table III indicate a favorable distribution of paraxylene into the slurry.

TABLE III

Paraxylene separation by Fe(4-methylpyridine)$_4$(SCN)$_2$ slurry made in situ

| Substance | Charge, g. | Extract from slurry, g. | Raffinate, g. |
| --- | --- | --- | --- |
| m-Xylene | 22.1 | 9.57 | 12.53 |
| Paraxylene | 11.2 | 9.29 | 1.91 |
| o-Xylene | 11.2 | 5.23 | 5.87 |
| Ethylbenzene | 11.2 | 6.14 | 5.06 |
| n-Heptane | 55.3 | 5.17 | 50.12 |
| Total | 111 | 35.40 | 75.5 |

Example IV 33.7 g. of $CoCl_2.6H_2O$, 53 g. of 4-methylpyridine, 27.6 g. of KSCN, and 2718 g. of propylene carbonate were mixed as in Example III for 5 minutes. 53.4 g. of mixed $C_8$ aromatics and 60.6 g. of n-heptane were added to the slurry; after 5 minutes of mixing at 25° C., considerable concentration of paraxylene in the slurry was observed as shown by the analytical results of Table IV.

TABLE IV

Paraxylene separation by Co(4-methylpyridine)$_4$(SCN)$_2$ slurry made in situ

| Substance | Charge, g. | Extract from slurry, g. | Raffinate, g. |
| --- | --- | --- | --- |
| m-Xylene | 21.1 | 11.34 | 9.75 |
| Paraxylene | 10.6 | 9.23 | 1.37 |
| o-Xylene | 10.8 | 6.19 | 4.57 |
| Ethylbenzene | 10.9 | 6.95 | 3.98 |
| n-Heptane | 60.6 | 11.48 | 49.14 |
| Total | 113.9 | 45.2 | 68.8 |

Example V

In this example a slurry of pre-synthesized Ni(4-methylpyridine)$_4$(SCN)$_2$ in a solvent of 10 wt. percent water in 2-methoxyethanol was used to extract benzene from heptane. 53.2 g. of dry Werner Complex powder was mixed with 334.6 g. of 2-methoxyethanol, 37.2 g. of water, 7.6 g. of 4-methylpyridine (added to avoid activity loss of the Werner Complex), 37.1 g. of n-heptane, 37.9 g. of benzene were equilibrated as in the previous examples. The analysis of the resulting phases, as shown in Table V, reflects extraction of the benzene by slurry.

TABLE V

Slurry extraction of benzene pre-synthesized Ni(4-methylpyridine)$_4$(SCN)$_2$

| Substance | Slurry extract, g. | Raffinate, g. |
| --- | --- | --- |
| n-Heptane | 15.0 | 22.1 |
| Benzene | 33.0 | 4.9 |
| Total | 48.0 | 27.0 |

The same weight of Werner Complex was then made in situ by mixing 23.1 g. of $NiCl_2$ $6H_2O$, 18.9 of KSCN, 42.9 g. of 4-methylpyridine, 334.6 g. of 2-methoxyethanol, 26.7 g. of water, and the same heptane and benzene weights as above. Table VI shows the analytical results; they are virtually identical to those of Table V, indicating good efficiency of slurry formed in situ.

TABLE VI

Werner complex slurry formed in situ

| Substance | Slurry extract, g. | Raffinate, g. |
| --- | --- | --- |
| n-Heptane | 15.6 | 21.5 |
| Benzene | 33.1 | 4.8 |
| Total | 48.7 | 26.3 |

What is claimed is:

1. A process for the selective separation of aromatics from a feed stream which comprises: contacting said feed stream with a slurry, said slurry comprising a solid capable of forming an insoluble inclusion compounds with said aromatics and an inert liquid solvent, said solvent being capable of extracting said aromatics from said feed stream and promoting the formation of two liquid phases in equilibrium with said inclusion compounds one liquid phase comprising feed stream depleted in aromatics and the other liquid phase comprising the solvent associated with the inclusion compound as a slurry, said second phase being enriched in aromatics, the improvement which comprises forming said solid in situ within said solvent.

2. The process of claim 1 wherein said solid is a Werner Complex.

3. The process of claim 2 wherein said solvent is selected from the group consisting of ether alcohols and polyols.

4. The process of claim 2 wherein said Werner Complex is formed in situ within the solvents by reacting a metal salt, said salt containing the desired positively charged metal ion, a second salt containing the desired anion group and a Werner amine.

5. A process for the selective separation of aromatics from a feed stream which comprises: contacting said feed stream with a slurry, said slurry comprising a Werner complex which is capable of forming an insoluble inclusion compound with at least one of the aromatics present in said feed stream, and an inert liquid solvent, said solvent being capable of extracting said aromatics from said feed stream and promoting the formation of two liquid phases in equilibrium with said inclusion compound, one liquid phase comprises feed stream depleted in aromatics and the other liquid phase comprises the solvent associated with the inclusion compound as a slurry, said second phase being enriched in aromatics, the improvement which comprises forming said Werner complex in situ within said solvent by reacting three elements, (1) a Werner salt having the general formula $M_1X_1$ wherein M is a metal of atomic number above 12 which is capable of forming Werner type complexes and $X_1$ is a negative radical; (2) a second salt having the formula $M_2X_2$ wherein $M_2$ is a positive ion, and $X_2$ is the anion species desired in the Werner complex; and (3) a Werner amine, said amine being a heterocyclic nitrogen base which binds to a central metal atom through coordinate bonds.

6. The process of claim 5 wherein the feed stream is a mixture containing paraxylene and at least one other compound selected from the group consisting of metaxylene, orthoxylene and ethylbenzene, wherein an inclusion compound forms between the Werner complex and the paraxylene, removing said inclusion compound within said slurry and recovering the paraxylene.

7. The process of claim 6 wherein $M_1$ is selected from the group consisting of nickel, cobalt, iron, manganese, silver, palladium, platinum, copper and zinc.

8. The process of claim 6 wherein $X_1$ is selected from the group consisting of halogenide, sulfate, nitrate, phosphate and carbonate.

9. The process of claim 6 wherein the Werner amine is selected from the group consisting of pyridine, pyrrols, substituted pyridine and substituted pyrrols.

10. The process of claim 6 wherein $M_2$ is selected from the group consisting of sodium, potassium, ammonium, barium, magnesium, aluminum or any combination thereof.

11. The process of claim 6 wherein the Werner complexes are formed in situ at about ambient temperature and about ambient pressure.

12. The process of claim 6 wherein said solvent is propylene carbonate.

13. The process of claim 6 wherein said solvent is selected from the group consisting of ether alcohols and polyols.

14. The process of claim 6 wherein said Werner complex is formed by reacting a hydrated chloride with 4-methyl pyridine and KSCN.

15. The process of claim 6 wherein said solvent is 2-methoxyethanol.

References Cited

UNITED STATES PATENTS

| | | | |
|---|---|---|---|
| 2,774,802 | 12/1956 | Christian | 260—674 |
| 2,798,891 | 7/1957 | Schaeffer | 260—674 |
| 2,842,604 | 7/1958 | Waals et al. | 260—674 |
| 3,222,414 | 12/1965 | Schaeffer | 260—674 |

DELBERT E. GANTZ, Primary Examiner

C. E. SPRESSER, Jr., Assistant Examiner

U.S. Cl. X.R.

208—308